(12) United States Patent
Kojima et al.

(10) Patent No.: US 7,120,986 B2
(45) Date of Patent: Oct. 17, 2006

(54) METHOD OF MANUFACTURING ROTOR OF ELECTRIC MOTOR

(75) Inventors: Tomonori Kojima, Kawasaki (JP); Toshiaki Tanno, Kawasaki (JP); Ken Maeyama, Kawasaki (JP); Hiroshi Okutsu, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 311 days.

(21) Appl. No.: 10/611,882

(22) Filed: Jul. 3, 2003

(65) Prior Publication Data

US 2004/0045154 A1    Mar. 11, 2004

Related U.S. Application Data

(62) Division of application No. 09/845,185, filed on May 1, 2001, now abandoned.

(30) Foreign Application Priority Data

May 17, 2000    (JP) .............................. 2000-145560

(51) Int. Cl.
*H02K 15/00* (2006.01)
*H02K 15/14* (2006.01)
*H02K 15/16* (2006.01)

(52) U.S. Cl. ............................. 29/596; 29/510; 29/598; 29/608; 29/609; 29/732; 156/294; 156/295; 264/272.2; 310/43; 310/89; 310/156.12

(58) Field of Classification Search .................. 29/596, 29/510, 598, 608, 609, 732; 264/272.2; 310/43, 310/89, 156.12; 156/294, 295
See application file for complete search history.

(56) References Cited

U.S. PATENT DOCUMENTS

| 4,206,379 A | * | 6/1980 | Onda ..................... 310/156.12 |
| 5,500,994 A | * | 3/1996 | Itaya ........................... 29/598 |
| 5,930,071 A | * | 7/1999 | Back ....................... 360/97.01 |
| 6,058,594 A | * | 5/2000 | Neumann et al. ............. 29/596 |

FOREIGN PATENT DOCUMENTS

| DE | 23 28 886 | | 1/1975 |
| EP | 0 215 450 | | 3/1987 |
| EP | 0633647 | * | 11/1995 |
| FR | 1346182 | | 12/1963 |
| WO | 99/12248 | | 3/1999 |

* cited by examiner

*Primary Examiner*—A. Dexter Tugbang
*Assistant Examiner*—Tim Phan
(74) *Attorney, Agent, or Firm*—Manabu Kanesaka

(57) ABSTRACT

In a method of manufacturing a rotor of an electric motor to be arranged inside a stator, a permanent magnet is formed in a ring-shape, and a rotating shaft and the permanent magnet are concentrically arranged in a mold. Then, a rubber material in a fluid state is poured into a space between the permanent magnet and the rotating shaft to vulcanize and mold a cushioning member having predetermined hardness. The permanent magnet and the rotating shaft are integrally coupled through the cushioning member.

6 Claims, 3 Drawing Sheets

METHOD OF MANUFACTURING ROTOR OF ELECTRIC MOTOR

CROSS-REFERENCE TO RELATED APPLICATION

This is a divisional application of Ser. No. 09/845,185 filed on May 1, 2001, now abandoned May 1, 2001, which claims priority to Japanese Patent Application No. 2000-145560, filed on May 17, 2001.

BACKGROUND OF THE INVENTION

The present invention relates to a method of manufacturing an electric motor for use with a household electrical appliance such as an air conditioner, industrial equipment and the like, and more particularly to a rotor of the electric motor causing little vibration during rotation.

The electric motor has been used for various electrical products, and as regards the air conditioner, in most cases, for its fan motor, there has been used an inner rotor type fan motor, in which a rotor is arranged inside a stator for generating a revolving magnetic field.

As the air conditioner is installed indoors, silence is required of the electric motor. In order to comply with this request, the inner rotor type has been improved in various ways, and its one example has been disclosed in Japanese Patent Application published under Publication No. 7-32841.

As shown in a cross-sectional view of FIG. 4 and a side view of FIG. 5, the rotor of this electric motor has a rotating shaft 1 and a permanent magnet 3 formed in a ring shape to be arranged coaxially to the rotating shaft 1. A rotational support (core) 2 having smaller outside diameter than an inside diameter of the permanent magnet 3 is fixed to the rotating shaft 1.

On coupling the rotating shaft 1 to the permanent magnet 3, a pair of left and right cushioning members 4 and 5 made of rubber is fitted in from the opposite sides respectively along the axial direction of the rotating shaft 1 in such a manner that they sandwich the rotational support 2 from both sides and that they enter between the rotational support 2 and the permanent magnet 3.

Thus, after end plates 6 and 7 are applied to the outside of each cushioning member 4, 5 while predetermined pressure is being applied, several (two pieces in this example) pins 8 are inserted through from one end plate 6 side to the other end plate 7, and their pin ends are fastened by belleville spring-shaped stoppers 9.

Thereby, the cushioning members 4 and 5 expand by pressure to be given by the end plates 6 and 7 to be brought into tight contact with the rotational support 2 and the permanent magnet 3 so that the rotational shaft 1 and the permanent magnet 3 are integrally assembled.

According to this structure, even if vibration is caused in the permanent magnet 3 during rotation, the vibration is absorbed by the cushioning members 4 and 5, and is not conveyed to the rotating shaft 1, and therefore, a vibration isolation effect is exhibited. Also, the structure of the cushioning member 4 or 5 is made bilaterally symmetrical, whereby both inclination and eccentricity of the permanent magnet 3 can be prevented. However, there was the following problem in the manufacture.

More specifically, in order to make a contact area between the rotating shaft 1 and the cushioning members 4, 5 larger, and to strongly couple them, it is necessary to fix the rotational support 2 to the rotating shaft 1. Also, in order to prevent the permanent magnet 3 from inclining and decentering, two cushioning members 4 and 5 having the left-right symmetrical shape are required, and in addition, the end plates 6 and 7 for fixing those, pins 8 and stoppers 9 are required, and the total number of parts becomes large to increase the manufacturing cost.

Next, as a result of a trial operation by actually mounting, for example, a fan to the rotating shaft 1 as a load after an electric motor is assembled using this rotor, when natural frequency of the load coincides with torsional natural frequency of the rotating shaft 1 to cause resonance, the design is forced to be substantially changed. Because the number of parts is large, it may come to design the electric motor again at the worst.

SUMMARY OF THE INVENTION

According to the present invention, it is possible to manufacture the electric motor at a low cost by realizing vibration isolation, eccentricity and the like of the rotor with a small number of parts. It is also possible to easily cope with even resonance which occurs between the electric motor and a load without involving changes in the design to a large extent, and to obtain an electric motor excellent in adaptability to various products.

For this reason, in the present invention, a rotor of an electric motor to be arranged inside a stator for generating a revolving magnetic field is provided with a permanent magnet formed in a ring shape; a rotating shaft arranged at the center of the permanent magnet; and a cushioning member made of rubber material having predetermined hardness, vulcanized and molded between the permanent magnet and the rotating shaft. The permanent magnet and the rotating shaft are integrally coupled through the cushioning member.

According to a preferred embodiment of the present invention, on the inner peripheral surface of the permanent magnet, there is formed a protruded portion which enters the cushioning member as an anchor.

For the above-described protruded portion, the plurality of protruded portions may be provided at predetermined intervals circumferentially on the inner peripheral surface of the permanent magnet, or formed in a series of flange shape circumferentially on the inner peripheral surface of the permanent magnet.

Also, joining of the permanent magnet and the rotating shaft to the cushioning member is preferably further reinforced by adhesive. In addition, a joined state of the rotating shaft and the cushioning member can be further reinforced by baking means using, for example, high frequency.

By taking such measures, the permanent magnet and the cushioning member, and the cushioning member and the rotating shaft are reliably joined respectively, and the permanent magnet and the rotating shaft are made integral through the cushioning member, and therefore, a rotating force of the permanent magnet is reliably transmitted to the rotating shaft, and strength capable of withstanding the rotating torque can be obtained.

It is also one of characteristics of the present invention that the above-described cushioning member is provided with displacement absorbing means for absorbing displacement of the cushioning member. The displacement absorbing means may be a plurality of through-holes formed in the cushioning member in parallel to the rotating shaft, or a plurality of recesses formed on both surfaces of the cushioning member, and in either case, absorbs displacement of the cushioning member to enhance the vibration isolation effect.

In this respect, for the above-described cushioning member, there are applicable various rubber material such as, for example, nitrile rubber (NBR), ethylene-propylene rubber (EDPM), butyl rubber (IIR), and chloroprene rubber (CR), and of these, the chloroprene rubber is preferable, which is easily available at low price, and yet is excellent in resistance to climate, resistance to chemicals, mechanical characteristics, adhesion properties and formability.

Also, in a method of manufacturing a rotor of an electric motor according to the present invention, a permanent magnet formed in a ring-shape in advance and a rotating shaft are concentrically arranged within a metal mold; a rubber material in fluid state is poured into a space between the permanent magnet and the rotating shaft to vulcanize and mold a cushioning member having predetermined hardness; and the permanent magnet and the rotating shaft are integrally coupled through the cushioning member.

In terms of weight reduction, the permanent magnet is preferably made of plastic magnet, and in this case, when the cushioning member is vulcanized and molded within a space between the permanent magnet and the rotating shaft, the molding temperature is controlled to be equal to or less than temperature at which the plastic magnet does not become deformed.

In the manufacturing method according to the present invention, an adhesive may be applied to both the inner peripheral surface of the permanent magnet and the rotating shaft, or either of them prior to vulcanizing and molding of the cushioning member. Also, it is possible to further bake a joined portion between the rotating shaft and the cushioning member after vulcanizing and molding of the cushioning member.

DETAILED DESCRIPTION

Figure 1:
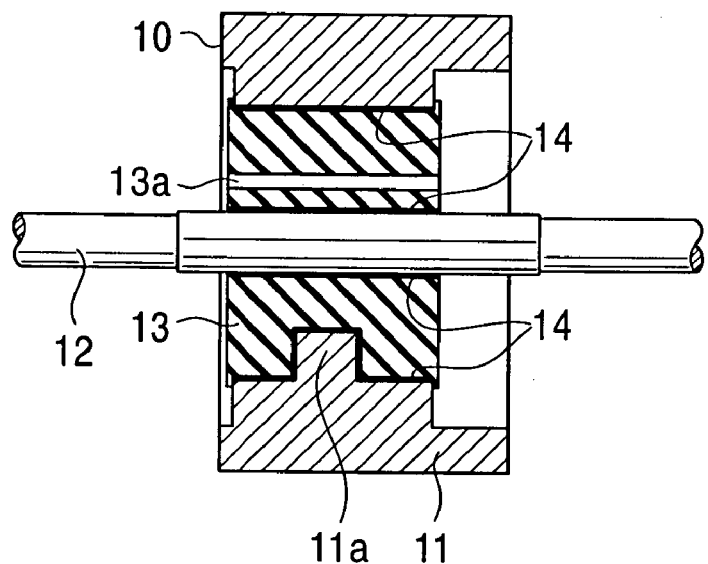
FIG. 1 is a cross-sectional view schematically showing a rotor of an electric motor according to an embodiment of the present invention.
Figure 2:
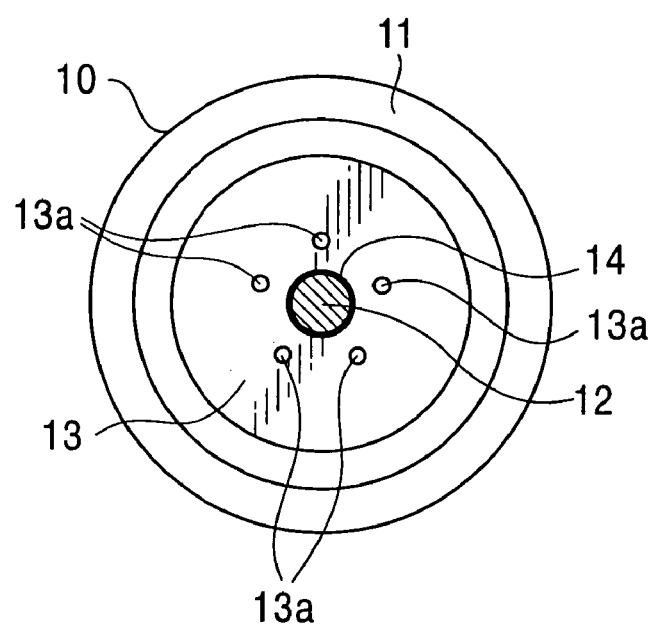
FIG. 2 is a side view showing the rotor shown in FIG. 1.

First, with reference to the cross-sectional view of FIG. 1 and the side view of FIG. 2, the description will be made of an embodiment according to the present invention. In this respect, in the present embodiment, the structure of the stator side for generating a revolving magnetic field has nothing direct to do with the gist of the present invention, and therefore, its illustration is omitted.

This rotor 10 is provided with a permanent magnet 11 formed in a ring shape; a rotating shaft 12 inserted in the center thereof; and a cushioning member 13 made of rubber material having predetermined hardness, vulcanized and molded between the permanent magnet 11 and the rotating shaft 12. The permanent magnet 11 and the rotating shaft 12 are integrally coupled through the cushioning member 13.

According to the present embodiment, the permanent magnet 11 is made of plastic magnet, and on the inner peripheral surface thereof, there is formed a protruded portion 11a which enters the cushioning member 13 as an anchor. For the protruded portion 11a, the plurality of protruded portions may be arranged at regular intervals circumferentially, or formed in a continuous flange shape. In this respect, the present invention does not exclude any permanent magnet made of metal, but the permanent magnet 11 may be made of metal.

Figure 4:
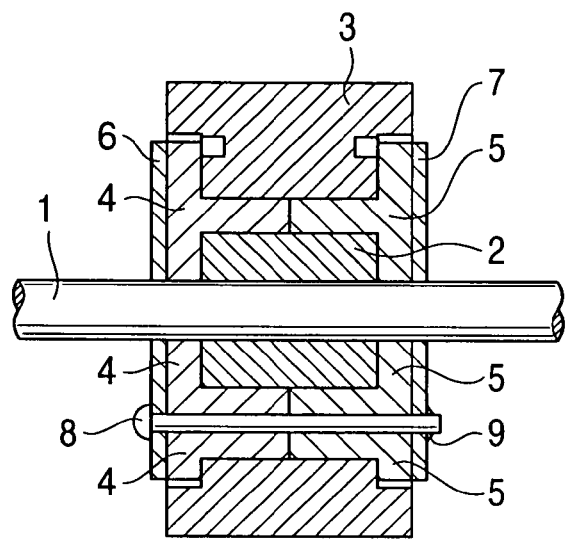
FIG. 4 is a cross-sectional view schematically showing a conventional rotor of an electric motor.
Figure 5:
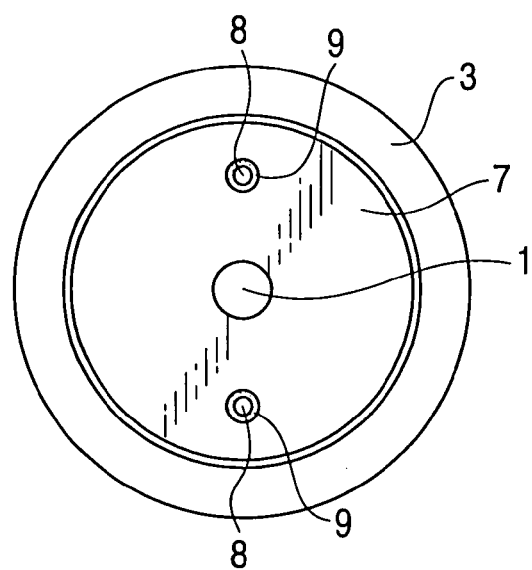
FIG. 5 is a side view showing the rotor shown in FIG. 4.

The rotating shaft 12 may be merely cylindrical column-shaped, and has no rotational support (core) 2 unlike the conventional example shown in FIG. 4.

In the present embodiment, for the cushioning member 13, the chloroprene rubber (CR) is used because it is easily available at low price, and yet is excellent in resistance to climate, resistance to chemicals, mechanical characteristics, adhesion properties and formability. The cushioning member 13 is formed by filling the space between the permanent magnet 11 and the rotating shaft 12 with chloroprene rubber in fluid state and vulcanizing.

Also, the cushioning member 13 is provided with displacement absorbing means for absorbing any displacement of the cushioning member 13. In the present embodiment, the displacement absorbing means is shown as through-holes 13a parallel to the rotating shaft 12, and the plurality of through-holes are provided with predetermined intervals in a direction of the circumference of a circle with the rotating shaft 12 being centered.

In this respect, in place of the through-hole 13a, a plurality of recesses (non-through holes) may be formed respectively on both sides of the cushioning member 13.

Next, with reference to FIG. 3, the description will be made of a method for manufacturing the rotor 10. First, the permanent magnet 11 formed in a ring shape in advance and the cylindrical column-shaped rotating shaft 12 will be concentrically set within a metal mold 15.

At this time, the inner peripheral surface of the permanent magnet 11 and the surface of the rotating shaft 12 are kept coated with adhesive 14. In this respect, a coating range of the adhesive 14 is only a place in contact with the cushioning member 13.

Then, the metal mold 15 is closed, and chloroprene rubber, which is material for the cushioning member 13, is poured into space between the permanent magnet 11 and the rotating shaft 12 through a filler hole 15a and is vulcanized to mold the cushioning member 13.

On vulcanizing and molding this rubber, temperature of the metal mold 15 and injection temperature of the molding material (chloroprene rubber) are preferably prevented from reaching deformation temperature of the plastic magnet, which is material of the permanent magnet 11.

Thus, within the metal mold 15, it is possible to manufacture a rotor 10 obtained by making the permanent magnet 11 and the rotating shaft 12 integral through the cushioning member 13.

Figure 3:
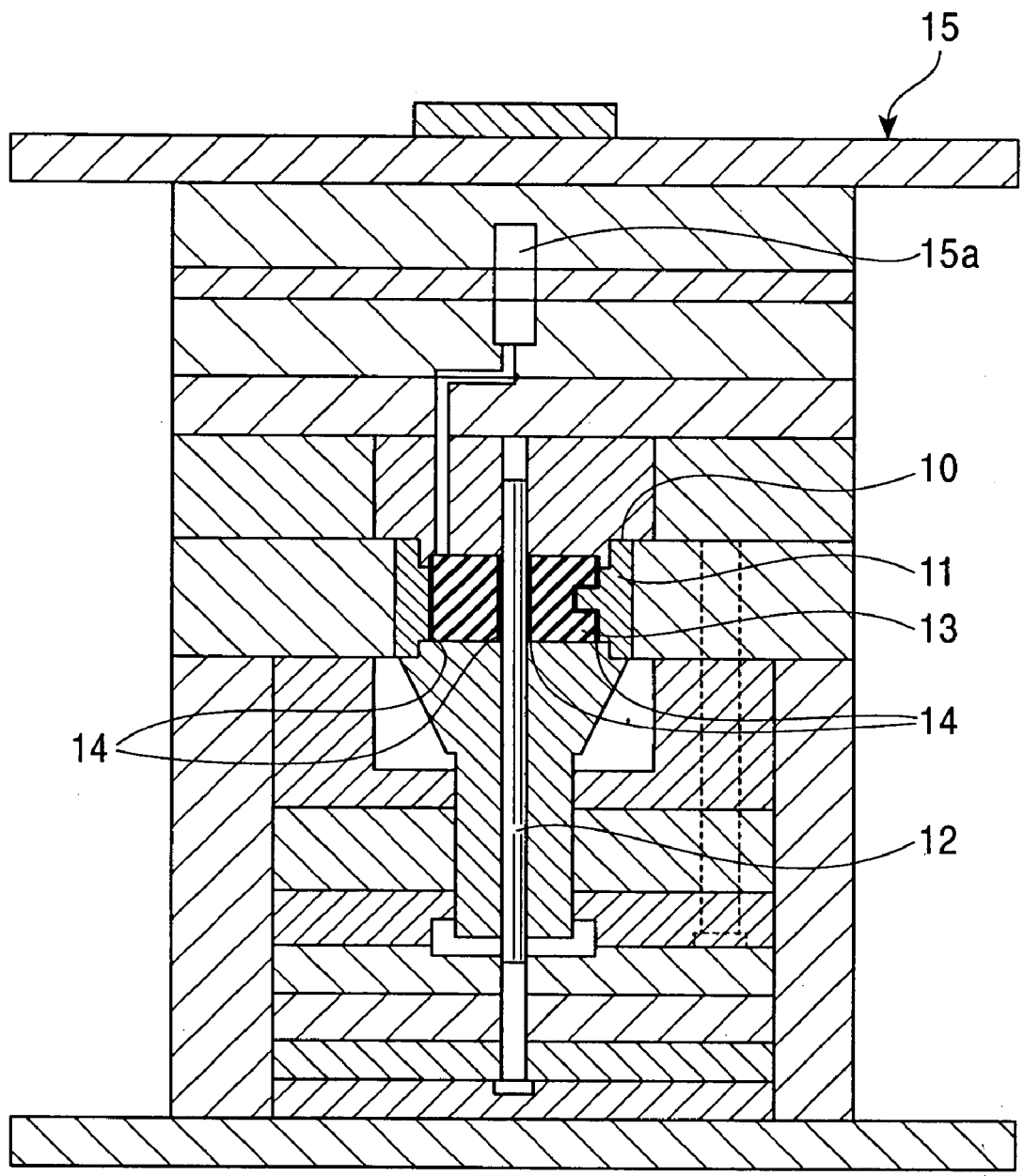
FIG. 3 is a schematic crosssectional view showing a metal mold device for use in a manufacturing method according to the present invention.

In this respect, although FIG. 3 does not show a through-hole 13a as the displacement absorbing means, a pin is stood at a formation position of the through-hole 13a on the metal mold 15, and the through-hole 13a is formed by the pin.

Unlike this, after the cushioning member 13 is molded and is taken out of the metal mold 15, the through-hole 13a (or a recess) may be formed by using, for example, a drill or the like.

According to this rotor 10, since the cushioning member 13 made of rubber material is interposed between the permanent magnet 11 and the rotating shaft 12, vibration, eccentricity and inclination caused by rotation of the permanent magnet 11 can be prevented by the cushioning member 13.

Also, through the through-hole 13a of the cushioning member 13, the displacement of the cushioning member 13 itself is absorbed, and therefore, its vibration isolation effect can be enhanced.

Also, for the main components, only the ring-shaped permanent magnet 11, a merely cylindrical column-shaped rotating shaft 12 having no slip preventing means (rotational support 2 of FIG. 4) and the cushioning member 13 will suffice, so that a number of components is reduced unlike the above-described conventional example, and therefore, the electric motor can be manufactured at low cost.

Further, the above-described manufacturing method under temperature control is only required to perform subsequent processing by cutting and the like for truing up the outside diameter (external shape of the rotor) of the permanent magnet 11. Accordingly, the required manufacturing number of hours is an exceedingly low, so that the manufacturing cost can be further reduced.

In this respect, the hardness of the cushioning member 13 can be selected by empirically obtaining hardness, at which the vibration to be generated by the permanent magnet 11 during rotation can be absorbed most effectively. Also, when, for example, a fan is driven by an electric motor using this rotor 10, the torsional frequency of the rotating shaft 12 is determined by the rotor 10 and its fan. According to the present invention, only by appropriately changing the hardness of the rubber material, it is possible to avoid the resonance phenomenon without the need for a change in design to a large extent. Therefore, it is possible to obtain an electric motor excellent in adaptability for various equipment.

In this respect, in the above-described embodiment, in order to further enhance the joining strength between the permanent magnet 11 and the cushioning member 13, a protruded portion 11a is provided inside the permanent magnet 11, and adhesive 14 is further used dually, and either of them may be omitted.

Also, in place of the adhesive 14, particularly on the rotating shaft 12 side, after the rotating shaft 12 is set within the metal mold 15 and rubber material is molded between them, the rubber material of the cushioning member 13 can be baked to the rotating shaft 12 by applying the high frequency welding method (Induction Heating Method) between the metal mold 15 and the rotating shaft 12.

While in the foregoing, the description has been made of the present invention with reference to specific embodiments, modifications and equivalent techniques which will readily occur to those skilled in the art based on the description should be naturally included in the claims of the present invention.

What is claimed is:

1. A method of manufacturing a rotor of an electric motor to be arranged inside a stator, comprising:
    forming a permanent magnet in a ring-shape,
    concentrically arranging a rotating shaft and the permanent magnet in a mold to have a space therebetween,
    pouring a rubber material with adhesive characteristic in a fluid state into the space between the permanent magnet and the rotating shaft, and vulcanizing and molding the rubber material to form a cushioning member having predetermined hardness so that the permanent magnet and the rotating shaft are integrally coupled through the cushioning member, and
    forming a plurality of holes in the cushioning member parallel to the rotating shaft and equally spaced apart from each other around the rotating shaft to absorb displacement of the cushioning member.

2. The method of manufacturing a rotor according to claim 1, wherein said permanent magnet is made of a plastic magnet, and when said cushioning member is vulcanized and molded in the space between the permanent magnet and the rotating shaft, a molding temperature is controlled to be equal to or less than a temperature at which the plastic magnet does not deform.

3. The method of manufacturing a rotor according to claim 1, wherein prior to vulcanizing and molding of said cushioning member, at least one of an inner peripheral surface of the permanent magnet and the rotating shaft is coated with an adhesive.

4. The method of manufacturing a rotor according to claim 1, wherein after vulcanizing and molding of said cushioning member, a joined portion between the rotating shaft and the cushioning member is further baked by high frequency welding method.

5. The method of manufacturing a rotor according to claim 1, wherein said holes are through-holes formed while the cushioning member is being formed or after the cushioning member is formed.

6. The method of manufacturing a rotor according to claim 1, wherein said holes are recesses on opposite surfaces of the cushioning member formed while the cushioning member is being formed or after the cushioning member is formed.

* * * * *